G. CLARKE.
BLOW-OFF AND VALVE FOR GAS TANKS.
APPLICATION FILED OCT. 30, 1912.
1,093,254.
Patented Apr. 14, 1914.
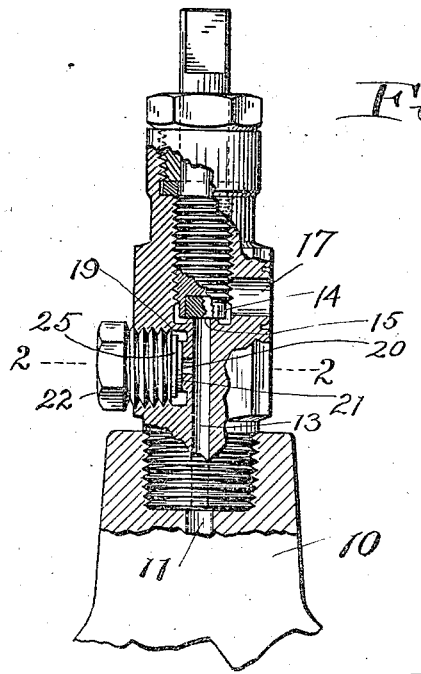
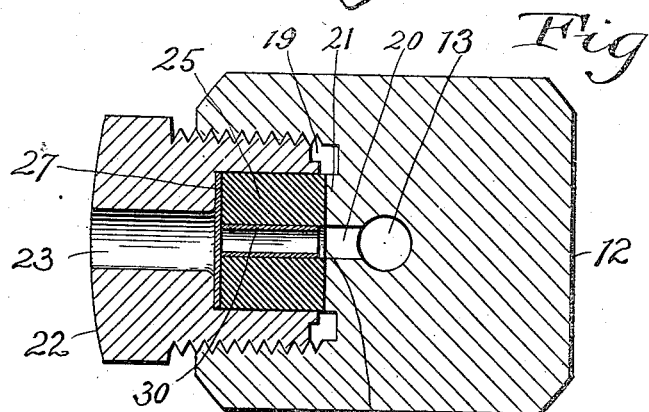
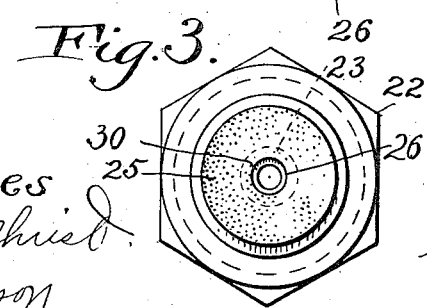
Witnesses
E. B. Gilchrist
A. J. Hudson
Inventor.
Graham Clarke
by Thurston & King
attys

UNITED STATES PATENT OFFICE.

GRAHAM CLARKE, OF CLEVELAND, OHIO, ASSIGNOR TO THE OHIO CHEMICAL AND MANUFACTURING COMPANY, OF CLEVELAND, OHIO, A CORPORATION OF OHIO.

BLOW-OFF AND VALVE FOR GAS-TANKS.

1,093,254.  Specification of Letters Patent.  Patented Apr. 14, 1914.

Application filed October 30, 1912. Serial No. 728,586.

*To all whom it may concern:*

Be it known that I, GRAHAM CLARKE, a citizen of the United States, residing at Cleveland, in the county of Cuyahoga and State of Ohio, have invented a certain new and useful Improvement in Blow-Offs and Valves for Gas-Tanks, of which the following is a full, clear, and exact description.

This invention is designed to be applied to tanks containing gas under heavy pressure,—the object being to comply with the regulations of the Interstate Commerce Commission and the bureau of explosives relating to the transportation of such tanks, and to do this with a cheap construction which will minimize the chance of loss of gas in transit, but which will permit the withdrawal of the gas as required for use.

The invention relates particularly to the construction of a safety relief valve and to the combination of the same with a gas tap,—substantially as herein shown and described and defined by the appended claims.

In the drawing, Figure 1 is a central vertical section of a gas tap in which the invention is embodied. Fig. 2 is a sectional view on the line 2—2 of Fig. 1; and Fig. 3 is a bottom plan view of the plug 22.

Referring to the parts shown in the drawings 10 represents the delivery neck of a tank adapted to contain gas under pressure, and 11 the outlet duct therethrough.

12 represents the gas tap casing which is to be screwed into said neck so that the gas delivery duct 13 therein will be in communication with duct 11 in the neck. A valve 14 which screws endwise into the casing 12 against or away from a seat 15 controls the outflow of gas,—which gas, when permitted to flow outward, passes out of the tap casing through a laterally extended duct 17.

In the side of the tap casing is a threaded recess 19 from the bottom of which a laterally extended safety duct 20 communicates with duct 13 below said valve seat, that is between the seat and the tank. In the bottom of the recess 19 around duct 20 is a raised annular valve seat 21. 22 represents a gland nut which screws into said recess. It has a cylindrical recess in its inner end, and a small hole 23 leading from said recess out through the end of the nut. A cylindrical valve 25 is fitted into this recess, and is of such length as to project only slightly beyond the inner end thereof. There is a longitudinal hole 26 through the valve from end to end through which gas from the tank may escape under certain circumstances. The escape of the gas is, however, normally prevented by an easily ruptured thin metal disk 27 which lies between the outer end of the valve and the annular shoulder or outer end of the recess in said nut. This valve 25 may be made of hard rubber, of Jenkins packing, or any other substance of similar nature,— that is to say, of material which, while practically non-compressible, will flow slightly under sufficient pressure.

When the parts are assembled as shown, and the nut is screwed in it will force the valve 25 against the seat 21 and will force the outer end of the valve and the metal disk and the annular shoulder on the nut into gas tight contact. To insure this, the nut must be screwed in sufficiently to cause a distortion of the valve. This pressure will cause the valve to tightly fill the recess in which it is placed, and will produce the gas tight contacts with the valve seat 21 and metal disk 27 which are required. If, however, the nut is screwed in too much, it might distort the valve to such an extent as to close up the hole 26 therethrough. To insure that this shall not take place, however tightly the nut may be screwed in, a metal tube 30 is fitted in the hole through the valve. With the construction shown, it is possible to screw the nut in so tight as to make it certain the gas tight joints shall be produced without danger of closing the safety vent through the valve.

With the construction shown and described the thin metal disk will be ruptured and permit gas to escape if the gas pressure in the tank exceeds the predetermined maximum. But the accidental escape of gas is effectually prevented so long as the metal disk remains unbroken. Moreover this safety relief device does not in any way interfere with the intentional withdrawal of the gas.

Having described my invention, I claim:

1. The combination of a tank adapted for containing gas under pressure, a piece which is secured in a hole in said tank and has a threaded recess opening outward and an outlet duct of smaller diameter leading from the bottom of said recess inward through said piece, with a gland nut which screws into said threaded recess and has a recess in its inner end, and a relief duct extending from said recess out through the end of the nut, a valve which is fitted in said recess and has a relief duct through it from end to end, a non-collapsible metal tube fitted in the last mentioned relief duct, and a thin rupturable disk in the recess in the nut in contact with the end of said recess and with the outer end of the valve.

2. A gas tank tap, comprising a casing adapted to screw into the gas tank and having an outlet duct, and a valve for said outlet duct, said casing having also a threaded recess in one side from which a relief duct extends into communication with the gas delivery duct at a point between the said valve and the inner end of the top casing, a gland nut which screws into said threaded recess, and has a recess in its inner end, and a relief duct extending from said recess out to the end of the nut, a valve which is fitted in said recess and has a relief duct through it from end to end, a non-collapsible metal tube fitted in the last mentioned relief duct,—and a thin rupturable disk in the recess in the nut and in contact with the outer end of the valve.

In testimony whereof, I hereunto affix my signature in the presence of two witnesses.

GRAHAM CLARKE.

Witnesses:
E. L. THURSTON,
A. J. HUDSON.